United States Patent
Maoz

[19]

[11] Patent Number: 6,041,697
[45] Date of Patent: Mar. 28, 2000

[54] APPARATUS FOR CONTROLLED CRACKING OF NUT-LIKE FRUITS AND THE LIKE

[76] Inventor: Chaim Maoz, 68 Prospect Ter., Tenafly, N.J. 07670

[21] Appl. No.: 09/099,717

[22] Filed: Jun. 18, 1998

[51] Int. Cl.[7] .................. A23N 5/00; A23N 5/08
[52] U.S. Cl. .................. 99/572; 99/579; 99/581; 99/568; 30/120.2; 30/120.5
[58] Field of Search .................. 99/568, 572, 573, 99/577–583, 574, 575, 600, 602, 617, 618; 83/856, 870, 932; 80/126, 129, 154; D7/680; 426/481–483; 30/120.1–120.5

[56] References Cited

U.S. PATENT DOCUMENTS

| | | | |
|---|---|---|---|
| 1,248,313 | 11/1917 | Gradick, Sr. | 30/120.2 |
| 1,526,593 | 2/1925 | French | 99/572 |
| 2,474,591 | 6/1949 | Murph | 99/579 X |
| 2,590,953 | 4/1952 | Gendler | 30/120.2 |
| 2,642,908 | 6/1953 | Landgraf | 99/579 |
| 3,310,083 | 3/1967 | Jennings | 99/579 |
| 4,145,962 | 3/1979 | Coleman et al. | 99/581 |
| 4,255,855 | 3/1981 | Brazil | 30/120.5 |
| 4,370,922 | 2/1983 | Rollband | 99/572 |
| 4,377,970 | 3/1983 | Kenkel | 99/572 |
| 4,466,343 | 8/1984 | Thompson | 99/572 |
| 4,838,155 | 6/1989 | Steffel | 99/572 |

*Primary Examiner*—Timothy Simone
*Attorney, Agent, or Firm*—Klauber & Jackson

[57] ABSTRACT

An apparatus for the controlled fracture of the outer hull of a nut-like fruit wherein a reciprocable piston is moved within a frame and is supported and guided by arms that interfit with the piston to guide it or non-rotating movement into and out of engagement with the nut-like fruit. A key actuator is rotated by the user and which rotates an actuator, threadedly interengaged with the frame and which serves to provide the reciprocable movement of the piston. The nut hull is itself positioned between the piston and an anvil that among the surfaces of the piston and anvil that crack the nut hull are both configured so as to retain the nut in a stable position where it can be acted upon by the apparatus. In an alternate embodiment, the apparatus is modified so as to act as a garlic press using the same piston constrained motion. In a still further embodiment. the apparatus is modified so as to operate as a corkscrew to safely and easily remove the corks from bottles such as wine bottles.

10 Claims, 10 Drawing Sheets

APPARATUS FOR CONTROLLED CRACKING OF NUT-LIKE FRUITS AND THE LIKE

FIELD OF THE INVENTION

The present application relates to an apparatus for the fracture of the outer hulls of nut-like fruits. More particularly, the apparatus in question may extend to other applications where reciprocable impact on a comestible product is desired, such as the crushing of garlic and the like.

BACKGROUND OF THE INVENTION

A variety of consumable products are known which are either disposed within inedible outer hulls or are otherwise less appealing in their natural state than might be the case if some physical modification were made. Specifically, a classification of fruits are known that have inedible outer hulls, but that contain desirable meat there within.

A true nut has a hard shell, does not split open when ripe, and has its kernel, or meat, in one piece. Acorns, hazelnuts, beechnuts, and sweet chestnuts are among the true nuts in the botanical sense. In the popular sense, many other foods are called nuts. Examples are the peanut, which is actually a legume, and the almond and coconut, which are drupes, or stone fruits. The edible portion of most nuts, true nuts or otherwise, is the embryo, in which large amounts of protein and fat are stored to nourish the young seedling plant. The nutshell protects the kernel from contamination.

Although without the nutshell, consumption of nuts would likely be unappealing, these shells can sometimes be the indirect cause of much frustration. For instance, when cracking the shell open, a handheld nutcracker is traditionally used. Although this type of nutcracker is effective in cracking the nutshell to expose the nutmeat contained, the delicious nutmeat is often crushed, and therefore, difficult to eat or completely undesirable.

A variety of devices are known for the fracture or cracking of nut hulls that employ a variety of physical movements. The traditional nut cracker comprised of two arms that are rotatable about a central yoke and are thereby squeezed together by hand pressure to crush the nut placed there between. This device which is still in broad use, has among its disadvantages, the tendency to shatter the nut hull and the delicate meat contained therein. This is so as there is no way to consistently apply the pressure in the crushing operation. Generally, when one applies pressure against the rigid outer hull of the nut, one tightens the grip around the nut cracker in a manner in which cannot be strictly calibrated. Frequently, strength of the person operating nut cracker is widely variant, and a strong grip and squeeze of the nut cracker arms may result in total shattering.

Various devices are known in the prior art that have sought to remedy the aforementioned difficulties by the application of a more controlled pressure against the nut during the process. For example, U.S. Pat. No. 1,248,313 to Gradick, Sr. discloses a nut cracker device which utilizes a reciprocating plunger arm with a head disposed at the forward portion thereof, and a corresponding anvil or platen adapted to receive the nut. The Gradick device, however, offers a small head or piston which is rigidly disposed on the end of the plunger arm and by its size, will cause the inordinate concentration of all of the pressure on a single point on the surface of the outer hull. The result of the operation of this device would be to puncture the outer hull and to destroy the nut meat contained therein before an effective fracture of the hull could be achieved.

U.S. Pat. No. 2,491,628 to Ventin et al utilizes a freely reciprocable plunger with a corresponding handle. The Ventin device, however, suffers from the same deficiencies as the traditional nut cracker of the prior art, as there is a lack of ability to calibrate the action of the plunger and therefore, the amount of pressure to be applied to the nut hull. The result of this, is that the nut will likewise he unduly fractured and the nut meat damaged.

Lastly, U.S. Pat. No. 2,590,953 to Gendler discloses a compact device with a chamber within which a nut may be placed, and a reciprocable plunger that is screw actuated for application of pressure to the nut. Gendler, like Gradick et al utilizes a plunger with a small piston head, with the result that the nut hull will be unduly fractured at one point on its surface and the nut meat will be damaged.

A need therefore exists for a device which provides the calibration of a screw actuated plunger while applying the forces of the crushing process uniformly and evenly so that the nut meat is undamaged while the hull is suitably fractured. It is to the satisfaction and solution of the aforementioned problems that the present invention is directed.

SUMMARY OF THE INVENTION

The broadest aspect of the present invention relates to an apparatus for the controlled fracture of the outer hull of nut-like fruit and foods of that type, which comprises a support housing comprising a base for the support of an anvil means for the reception of said nut-like fruit; arcuate frame means communicating with said support housing, having an apical end and arms extending away therefrom, said arms adapted for connection to said base adjacent said anvil means, and a screw-threaded opening at said apical end, reciprocable plunger means associated with said frame means, said plunger means comprising a reciprocable piston, said piston adapted for sliding contact with said arms throughout its extent of travel, and screw-threaded actuator arm means screw-threadedly reciprocable within said opening, said actuator arm having a proximal end freely rotatably journaled within said piston, and a distal end extending beyond said opening; and a key-like actuator mounted on said distal end for the rotation of said actuator arm in the operation of said plunger means; wherein the operation of said apparatus permits the controlled fracture of the outer hull of the nut-like fruit without damaging the meat contained therein. Preferably, the apparatus may be made from a durable metal such as cast aluminum and the parts in question may be prepared so as to be interchangeable for other purposes.

More particularly, the apparatus of the present invention is made in a generally cylindrical shape and the arms of the frame means are disposed parallel to each other. The arms in turn, define surfaces that are juxtaposed to each other which surfaces serve as tracks for the controlled reciprocation of tile piston from the plunger means. The piston in turn may be prepared as a multiple component device. Specifically, the piston is adapted to receive the proximal end of the actuator arm for free rotation thereof. In this connection, the proximal end of the actuator means defines an indentation or notch which is adapted for reception for a correspondingly reduced diameter disk or insert of a portion of the piston. The piston in turn is prepared in disk-like segments that are fastened to each other during assembly and that thereby accommodate the free rotation there within the actuator arm.

The piston on the opposite surface thereof (the impact surface) defines a concavity which concavity corresponds to the position of the nut workpiece during the fracturing operation. This concavity corresponds to a like concavity disposed within the anvil that is juxtaposed to the piston in the full assembly of the apparatus.

The apparatus of the present invention may be used for a variety of other purposes including the crushing of garlic cloves, onions and the like, e.g. for use as a garlic press. In such event, the anvil will define slots that in turn, represent a screen-like member so that the crushed fragments of the garlic may be separated from the remainder of the original clove so that fragmented garlic material may be recovered. In such instance and in this embodiment, the portion of the piston making contact with the garlic will define a plurality of regularly spaced teeth or other protrusions, that will assist in the crushing and maceration of the garlic clove and that will force the garlic fragments through the screen-like slots of the anvil. In this latter mentioned embodiment, the base will represent a removable receptacle for the crushed garlic material.

In a further embodiment of the present invention, the device may be modified by the removal of the base and the associated anvil, and the disposition on the piston of a corkscrew auger. Likewise, an appropriate retaining ring may be disposed for reception by the arms of the frame, in the same fashion as the frame retains and associates with the base. As modified, the apparatus of the present invention may then serve as a corkscrew or cork removing device for wines and other bottled beverages. In similar fashion to the controlled operation achieved when the apparatus of the present invention is applied to the fracture of nut hulls, the cork screw may be carefully operated so as to embed the auger in the cork and then slowly withdraw the cork without fracturing the fragile cork composition. In this embodiment, the auger component is associated with the piston in a rachet and pawl relationship where the downward pressure of the piston on the auger assembly engages the same and causes its rotation into the cork. Upon withdrawal, however, the rachet assembly disengages with the result that the auger remains stationary while being lifted upwardly by the screw action of the upper portion of the piston.

The multiple uses of the present invention are clear from the aforementioned description. Moreover, the appearance of the device is particularly attractive and can lend itself admirably to any domestic decor, if the device is to be displayed when not in use, or even in party settings where use would be contemplated in the instance of the nut cracker function.

Accordingly, it is the principal object of the present invention to provide a device for the controlled fracture of nut hulls and the like which achieves such objective with a minimum of damage to the nut meat.

It is the further object of the present invention to provide an apparatus as aforesaid that is of simple durable construction and reliable operation.

It is the further object of the present invention to provide an apparatus as aforesaid that has the versatility for use in other functions than as a nutcracker, such as for use in the crushing of garlic and other fruits and vegetables.

It is yet a further object of the present invention to provide an apparatus which may be easily modified to function as a corkscrew, as well as to provide as a separate item, a fully functioning corkscrew having some of the design features as aforesaid.

Other objects and advantages will become apparent to those skilled in the art from a review of the detailed description which proceeds with reference to the following illustrative drawings.

DETAILED DESCRIPTION

In accordance with the present invention the foregoing objects and advantages are readily obtained.

Figure 1:
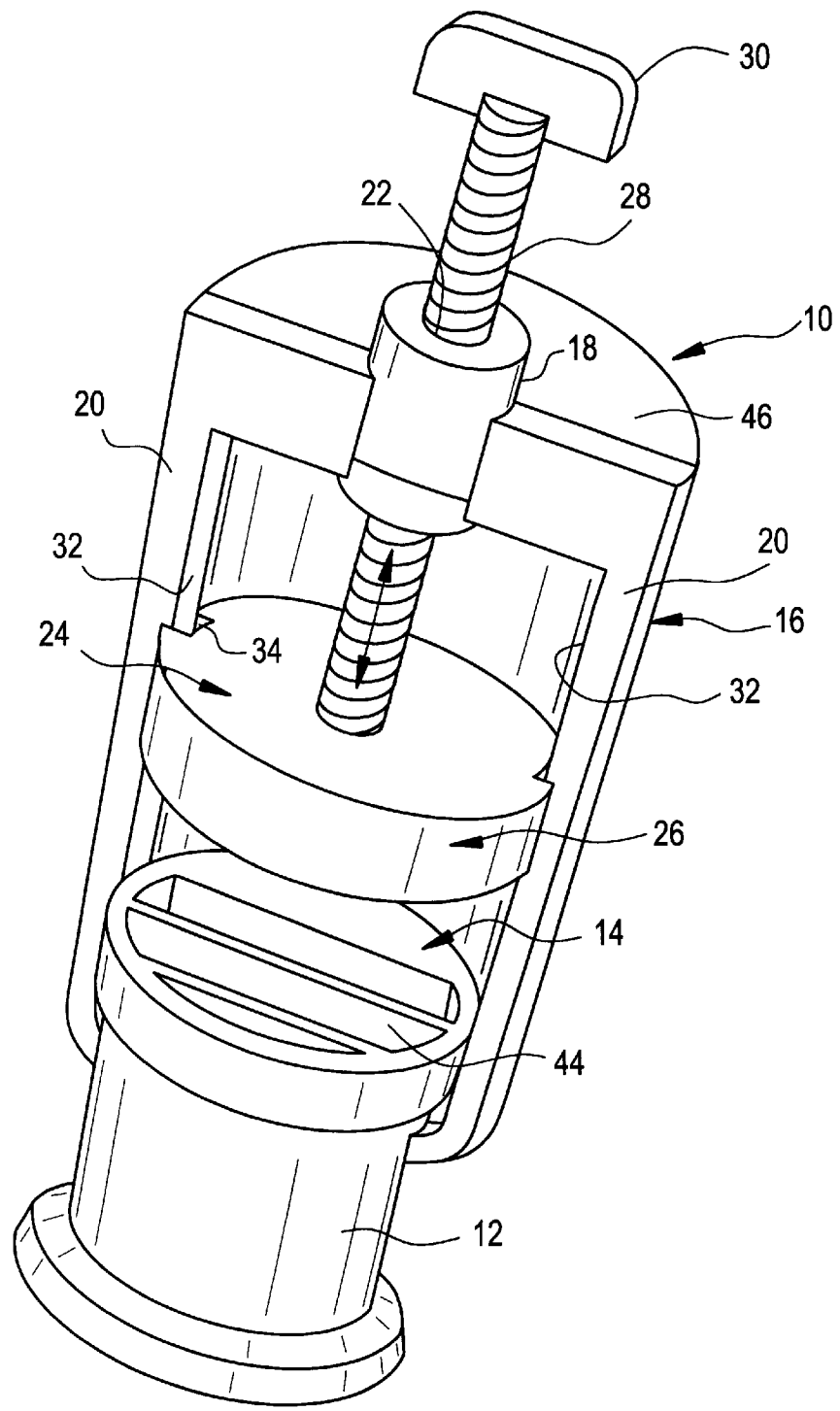
FIG. 1 is a perspective view of the nutcracker embodiment of the apparatus of the present invention.

Referring now to the figures wherein like numerals designate like parts and particularly the FIG. 1, the apparatus 10 of the present invention comprises a support housing 12 which is a base for the support of an anvil means which anvil means is depicted at 14. The base in turn is adapted for the reception and association with arcuate frame means 16 as shown. Frame means 16 in turn defines an apical end 18 and arms 20 extending downwardly therefrom as depicted in FIG. 1. Arms 20 in turn at their distal ends are adapted for communication with base 12 as shown and as will be clearly illustrated herein, grasp and connect with base 12 to form the overall body of the apparatus.

Referring further to FIG. 1, apical end 18 defines a screw threaded opening 22 which receives the reciprocable plunger means generally illustrated at 24. Plunger means in turn comprises a reciprocable piston 26 which is associated with a corresponding screw threaded actuator arm 28 which is adapted for free rotation within piston 26 and is thus freely rotatably journaled therein. Actuator arm 28 extends beyond opening 22 and at the end thereof terminates with key like actuator 30 that is mounted thereon.

Referring further to FIG. 1, piston 26 as described earlier, is adapted for reciprocation into contact with corresponding anvil 14. Piston 26 is limited in its movement to linear reciprocation by its interaction with the arms 20 of frame means 16 specifically, and with reference to FIGS. 1 and 3, arms 20 define juxtaposed surfaces 32 that provide tracks for the reception of corresponding indentations 34 on the opposed marginal edges of piston 26. Thus, piston 26 is adapted to ride along the tracks defined by arms 20 and is thereby stabilized and steadied in its movement. This stable movement confers additional control to the apparatus in the fracturing process.

Figure 1A:
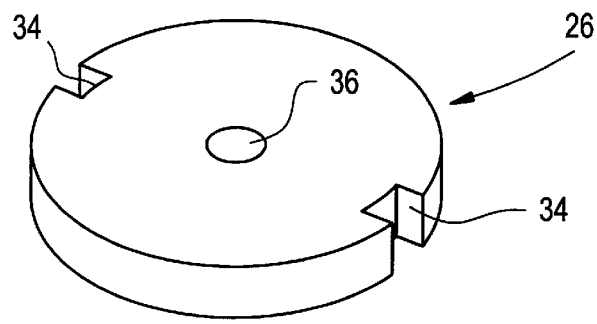
FIG. 1A is a perspective view of a piston of the present invention.
Figure 1B:
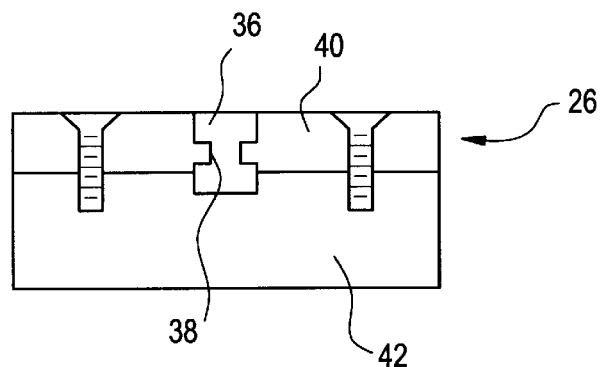
FIG. 1B is a side sectional view of the piston shown in FIG. 1A.

Referring now to FIG. 1A the piston 26 of the present invention is shown in a perspective isolated view wherein the marginal indentations 34 may be better visualized. In FIG. 1B, a side sectional view of piston 26 is shown wherein the details of its construction in accordance with a first embodiment of the invention are disclosed. Specifically, and with reference to FIG. 1A, pistol 26 can be seen to have a central opening disposed therein labeled 36, which opening is adapted for the freely rotatable reception of the actuator arm 28 as described earlier herein. Opening 36 can be seen to define therein a reduced diameter neck 38 which neck is adapted to associate with a corresponding ring-like indent on actuator arm 28. Moreover, piston 26 as shown may be constructed in modular fashion whereby the upper portion 40 of piston 26 is separable from the lower portion 42 to enable the positioning therein of the corresponding proximal end of the actuator arm 28 as described. In this manner therefore, the actuator arm is disposed for free rotation during the operation of the apparatus 10 as explained herein.

Figure 2:
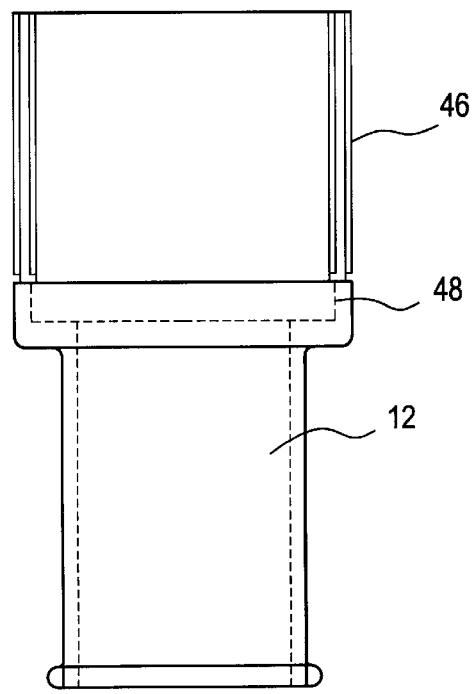
FIG. 2 is a plan view showing the housing of the apparatus of the present invention.

Referring now to FIG. 2, there is shown a plan view of the housing 12 used in carrying out the present invention. As can be seen, the housing 12 includes a semicircular wall member 46 that extends upwardly from the base 12 and contains the fragments of the nut meat within the apparatus 10 during it use. As is further noted, the housing 12 includes a circular support ledge 48 that, as will be explained, is used to provide a support for the arcuate frame means 16.

Figure 3:
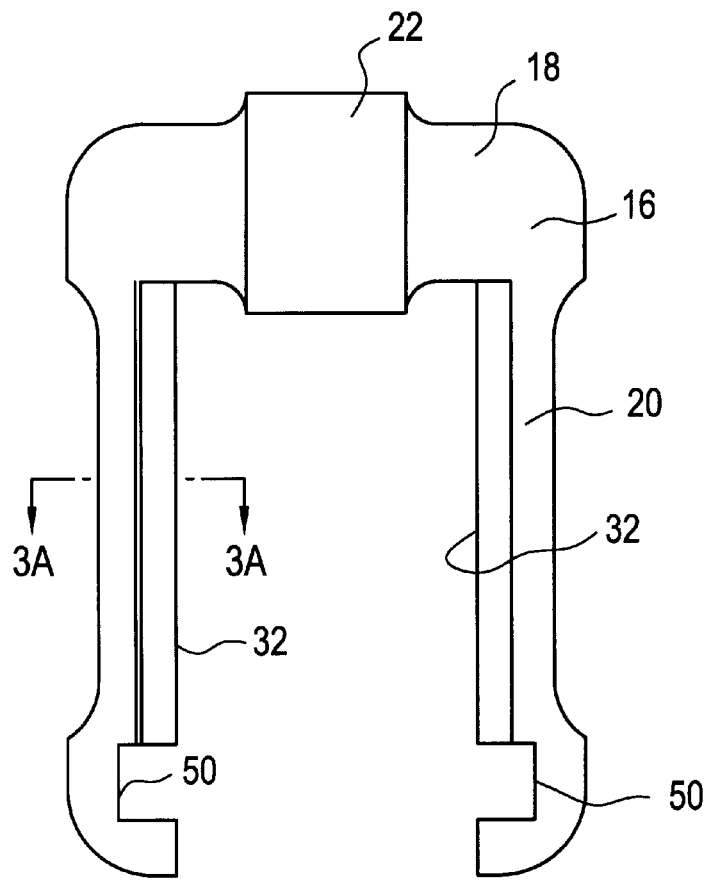
FIG. 3 is a plan view showing the frame of the present invention.
Figure 3A:
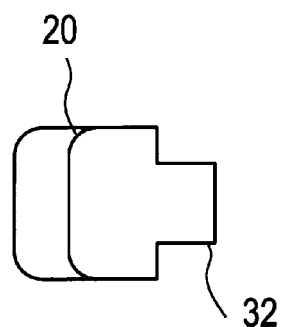
FIG. 3A is a cross sectional view of one of the arms of the frame taken through the line 3—3 of FIG. 3

Turning next to FIG. 3, there is shown a plan view showing the frame 16 used in the present invention. At the apical end 18 of the frame 16, there is provided the threaded opening 22. Arms 20 extend downwardly therefrom and at their distal ends, provide suitable shaped notches 50 that, when assembled as in FIG. 1, engage and hold firmly to the circular support ledge 48. The inner surface of the arms 20 provide the juxtaposed surfaces 32 to guide the piston 26 along its travel and prevent it from rotating such that the piston only moves in a linear, reciprocable mode. FIG. 3A is a cross sectional view of one of the arms 20 taken along the line A—A of FIG. 3 and more clearly show the juxtaposed surface 32 that provides the guide to the piston 26.

Figure 4:
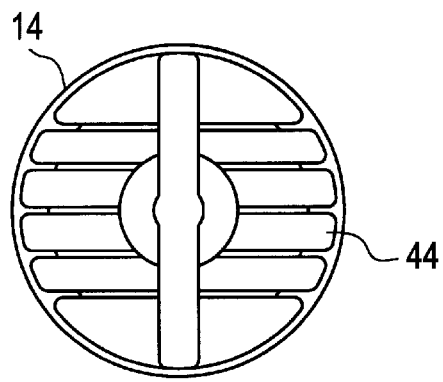
FIG. 4 is a top elevational view showing the anvil of the present invention.
Figure 5:
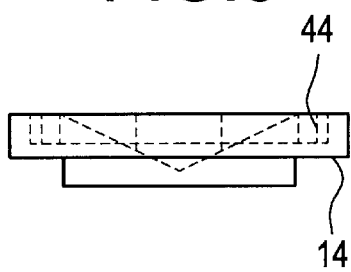
FIG. 5 is a side view of the anvil shown in FIG. 4.

Referring now to FIGS. 4 and 5, there is shown a top elevational view and a side view of the anvil 14 of the present invention in greater detail, and can be seen to comprise an essentially disk-like device having a circular/cylindrical shape. Anvil 14 defines a plurality of slots 44 which in the first mentioned embodiment of the present invention may be appropriately configured as shown. Particularly, slots 44 may define openings along the entire broad surface of anvil 14, or may, as desirable in accordance with the first embodiment of the first invention, define one arcuate end thereof which is solid. This solid end is disposed within the housing 12 as shown in FIG. 1 against the wall member 46. As can be seen, in the embodiment of FIGS. 4 and 5, there is an arcuate surface formed in the anvil 14 and which retains the nut-like fruit in a secure position during the hull cracking process. As can be seen in FIG. 1, the anvil 14 may be inserted into the base 12 as a separate component or, alternatively, the anvil 14 can be cast as a integral part of the support housing 12.

Figure 6:
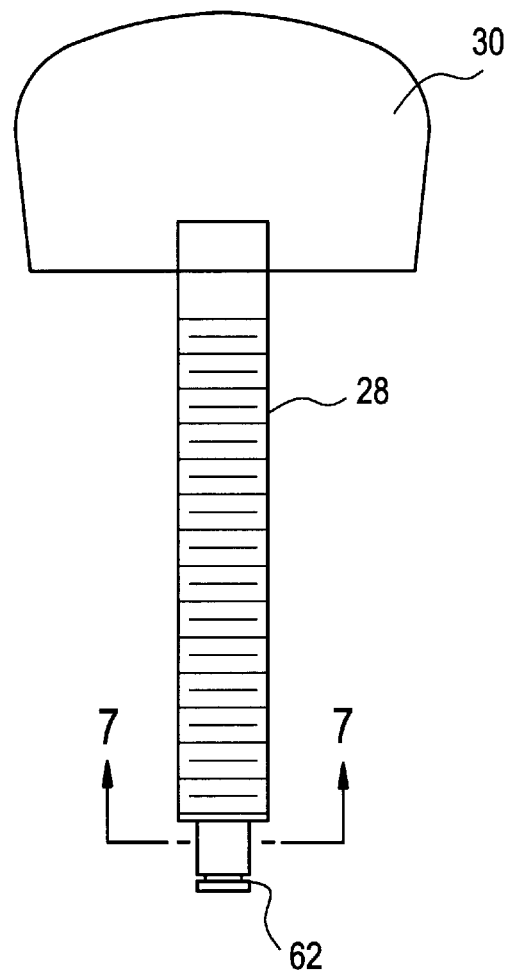
FIG. 6 is a side elevational view showing the screw threaded actuator arm and corresponding actuator key of the present invention.
Figure 7:
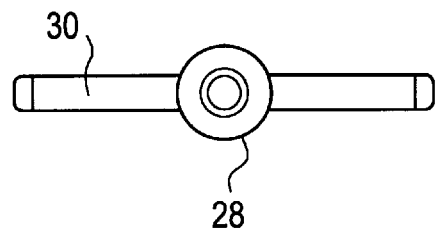
FIG. 7 is an end view thereof taken through line 6—6 of FIG. 6.

In FIGS. 6 and 7, there is shown, respectively, a side elevational view and an end view taken along the line 6—6 of FIG. 6 and showing the screw threaded actuator arm 28. The key like actuator 30 is sufficiently sized to allow the user to get sufficient leverage in turning the screw threaded actuator arm 28 in carrying out the purposes of the invention. At the distal end of the screw threaded actuator arm 28, there is a slot 52 to provide for convenient affixation of the distal end of the reciprocable piston 26 such that the rotational movement of the screw threaded actuator arm 28 is not translated to the reciprocable piston 26.

Thus, returning briefly to FIG. 1, in the first embodiment of the present invention, it can be seen that the apparatus 10 can readily retain a product such as an edible nut having a hard hull within the anvil 14 by the means of a arcuate shaped surface where the product is securely held during operation of the apparatus. The user can, by turning the key like actuator 30 and thus the actuator arm 28, cause the piston 26 to move in a linear, non-rotating manner toward the nut product. The stability of the movement of the piston is provided by means of the juxtaposed surfaces 32 that ride within the oppositely located indentations 34 in the piston 26. The lower surface of the piston 26 thus can be brought to bear against the hull of the particular product and the additional movement of the piston 26 causes the hull to break. Due to the unique configuration of the lower surface of the piston 26 and the upper surface of the anvil 14, the nut is retained in the correct position during the procedure by the mutual concavity of those surfaces. Upon cracking of the hull, the nut meat is retained in the apparatus 10 until removed by the user. Since the amount of pressure that can be exerted against the hull of the product is controllable, the hull of the particular nut can be broken without damage to the nut meat within the hull and in accordance with the purpose of the first embodiment of the present invention.

Figure 8:
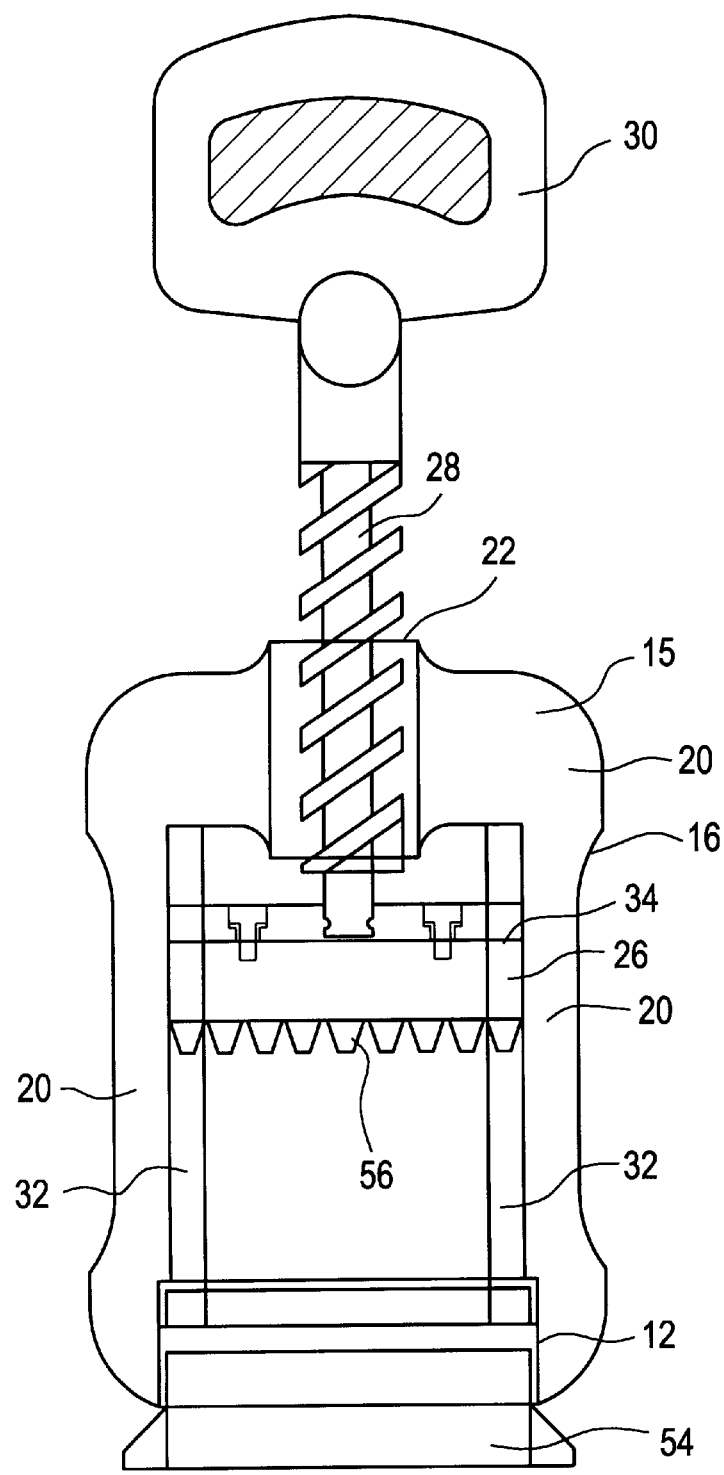
FIG. 8 is fragmentary side view of the apparatus of the present invention modified for use as a garlic press.

Turning now to FIG. 8, there is shown a fragmentary view of the apparatus of the present invention that has been modified to use as a garlic press or to press onions or the like. A further use could be to crush the nut meat that has been removed from the hull of that nut. In this embodiment, the same principle of operation of the apparatus 10 is used, that is, the reciprocable piston 26 is caused to move into engagement with the product and the piston again, does not have any rotational component of movement but is supported, as described with respect to the first embodiment for linear reciprocable motion only. In this embodiment, the base 12 is hollowed throughout and has a bottom 54 that is open for discharge of the garlic substance. Again, however, similar components are present as in the first embodiment and include a frame 16 having an apical end 18 and a pair of arcuate arms 20 extending from the apical end 18 downwardly and being affixed to the base 12. A wall member 46 is also utilized and which contains the particular product. In the case of a garlic product, the use of the wall member 46 allows the crushing of multiple cloves of garlic simultaneously and the individual cloves are contained within the apparatus. The reciprocable piston 26 moves within the frame 16 and is prevented from rotational movement by the juxtaposed surfaces 32 that ride within a corresponding indentations 34 in the piston 26. Thus, again the movement of the piston 26 is a linear, non-rotating motion and the control of the pressure to be exerted against a food product, such as garlic, is again deliberately controlled. The piston 26 is moved by the rotating actuator arm 28 that is threaded through a threaded opening 22 in the apical end 18 of the frame 16. Accordingly, the principle of operation is the same as the first embodiment, however, as can be seen in FIG. 1, there are a plurality of teeth 56 that depend downwardly from the piston 26 and are therefore directed toward the base 12, the purpose of which will be later explained.

Figure 8A:
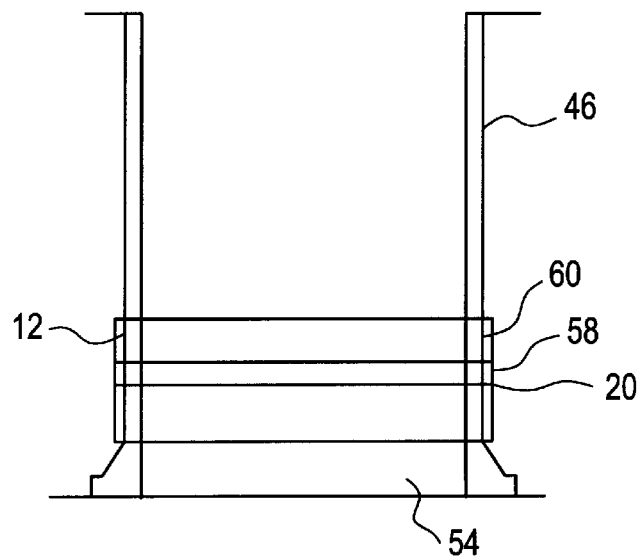
FIG. 8A is a plan view showing the housing of the FIG. 8 embodiment.

Turning to FIG. 8A, there is shown a plan view of the base 12 used with the present embodiment and which has an open bottom 54 and also includes a screen 58 and a hollow cylindrical ring 60 extending upwardly from the screen 58. Again, the wall member 46 extends further upwardly for containing the particular food garlic in the desired position. As will be seen, the particular product to be pressed, is placed within the cylindrical ring 60 and is thus contained therein during the pressing operation as will be explained.

Figure 8B:
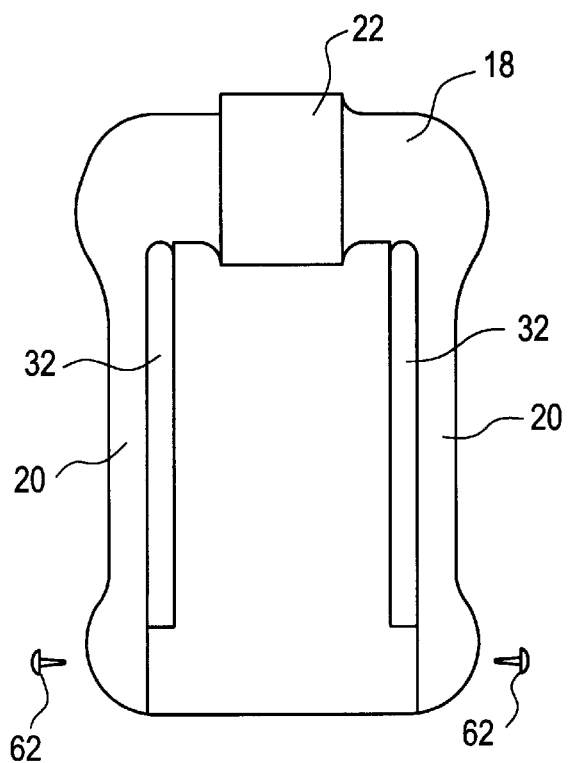
FIG. 8B is a plan view showing the frame of the FIG. 8 embodiment.

In FIG. 8B, there is shown a plan view of the frame 16 and showing the arcuate arms 20 depending from the apical end 18 and, in the embodiment as shown the distal end of the frame 16 can be affixed securely to the hollow ring 60 and the base 12 (FIG. 8A) by means of small screws 62 to complete the assembly of the apparatus.

Figure 8C:
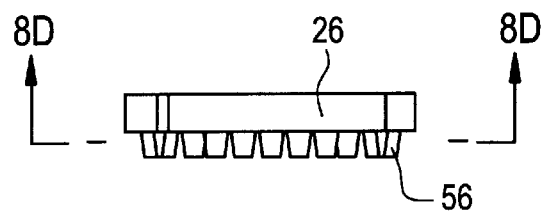
FIG. 8C is a side schematic view showing the head of the piston that is present in the garlic press embodiment of FIG. 8.
Figure 8D:
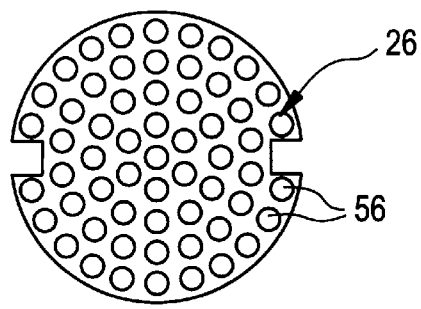
FIG. 8D is a sectional view of the piston of FIG. 8C taken along the lines A—A of FIG. 8C.

Turning to FIG. 8C, there is shown a side view of the piston 26 that is used with the embodiment and a further view in FIG. 8D of the cross sectional view of the piston 26 taken along the lines 8—8 of FIG. 8C. In FIGS. 8C and 8D, the piston 26 is shown in detail. including the plurality of teeth 56 that are preferable frustro-conical in configuration and extend a predetermined distance from the lower surface of the piston 26. As can be seen, the actual number and size of the particular teeth 56 may vary depending on the purpose of the apparatus, however in the embodiment shown the teeth 56 are uniformly spaced throughout the bottom of the piston 26 in order to provide uniform and complete pressing of the garlic product. As shown, the teeth are in the preferred configuration, however, other protrusions may be used with the present invention and the shape of the protrusions may vary in accordance with the particular material that is desired to be pressed.

Figure 8E:
FIG. 8E is a side view of and screen-anvil used with the FIG. 8 embodiment.
Figure 8F:
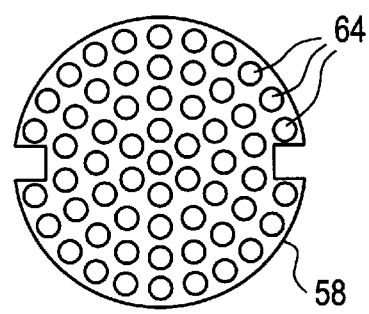
FIG. 8F is a bottom view of the screen-anvil of FIG. 8E.

Turning to FIG. 8E and 8F, there is shown respectively, a plan view and a bottom view of the screen 58 and showing a plurality of apertures 64 that correspond to the number and size of the teeth 56 extending outwardly from piston 26. As is now clear, and returning to FIG. 8, the plurality of teeth 56 on the bottom surface of the piston 26 serve to crush the garlic product that is placed on top of the screen 58 such that the teeth pass through the garlic product and enter into the apertures 64 to fully press the garlic in a controlled fashion. Thus, the use of the teeth 56 crushes the garlic and pushes the mashed garlic through the apertures 64 in a clean and efficient manner.

Figure 9:
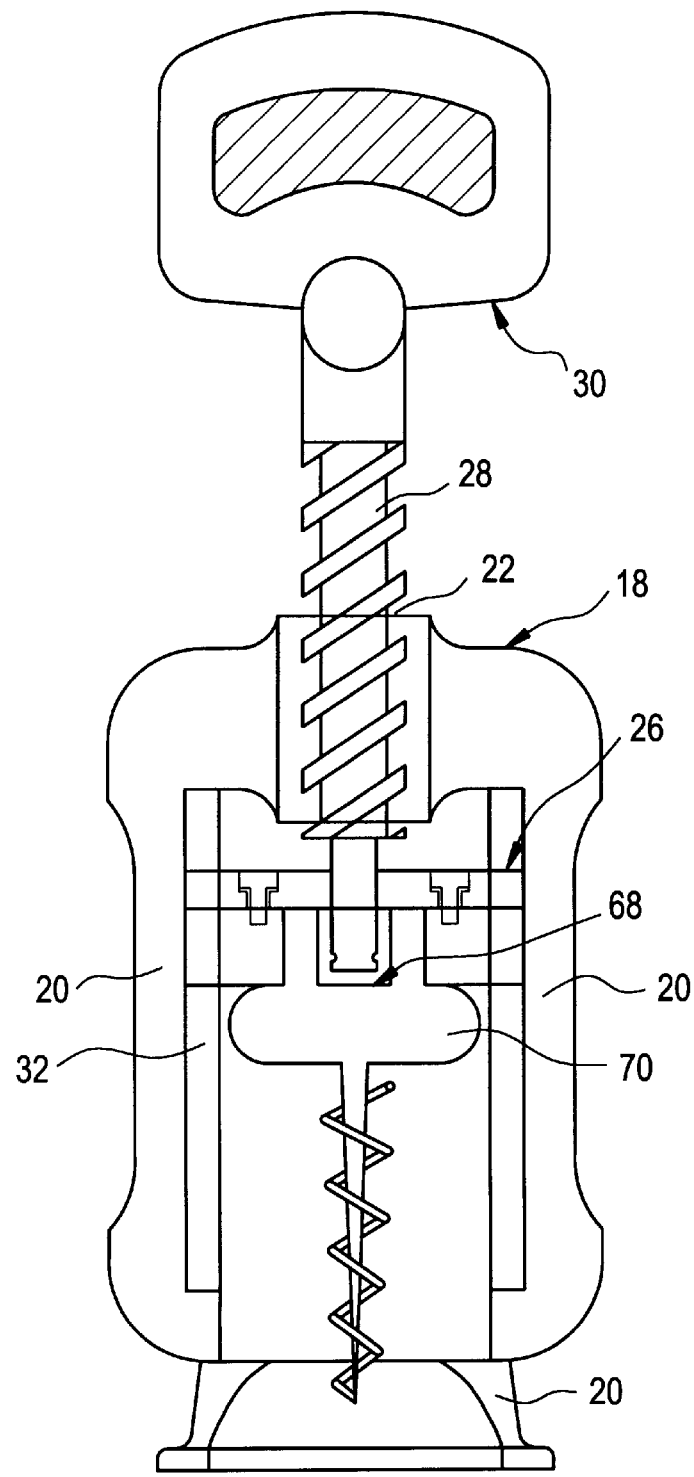
FIG. 9 is a schematic side view of a portion of the apparatus of the present invention modified to serve as a corkscrew.
Figure 9A:
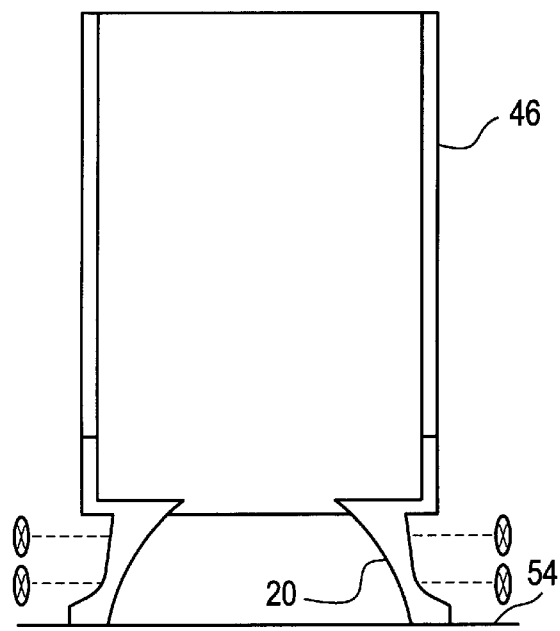
FIG. 9A is a plan view showing the housing of the FIG. 9 embodiment.

Turning now to FIG. 9, there is shown a further embodiment of the present invention in which the apparatus serves as a corkscrew with the same controlled pressure advantage as in the previous embodiments and with a piston 26 that is moved in a linear, non-rotating fashion. In this embodiment, the piston 26 moves in the same manner as in the previous two embodiment, however the base 12 has an open bottom 54 that is sized so as to fit over the glass top of a wine bottle or other bottle sealed with a cork. The base 12 is shown in plan view in FIG. 9A and the open bottom 54 is of a standard size to press against the top of the wine bottle but having a sufficiently large opening to allow the passage of the cork from the wine bottle to enter the base 12 as it is removed from the wine bottle.

Figure 9B:
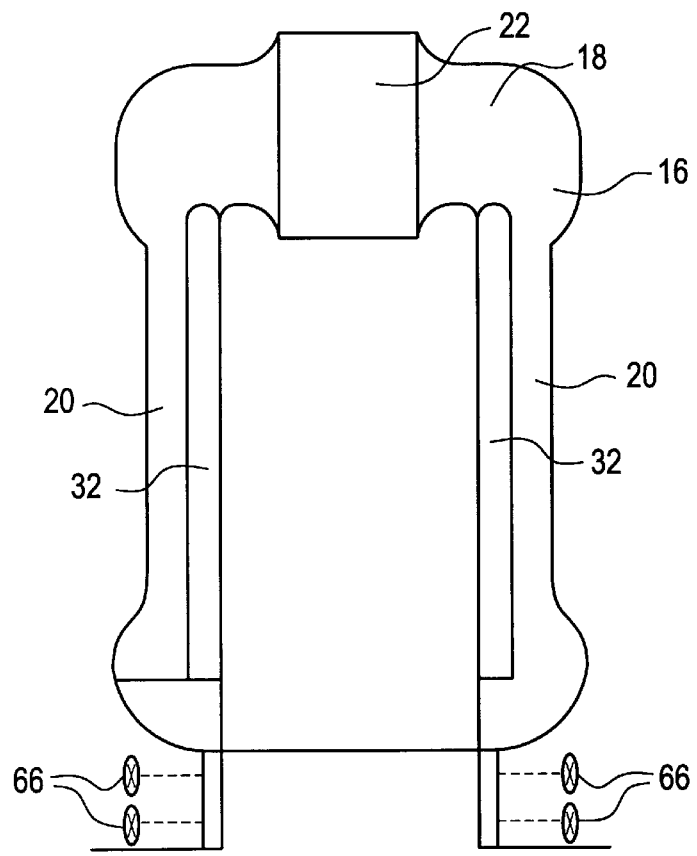
FIG. 9B is a plan view showing the flame of he FIG. 9 embodiment.

In FIG. 9B, there is shown a plan view of the frame 16 and again, as with the previous embodiment the frame 16 may be affixed to the base 12 by means such as screws 66. As in the prior embodiments, the arcuate frame 16 includes arms 20 extending from the apical end 18 and those arms 20 have juxtaposed surfaces 32 that serve to guide the travel of the piston 26 and prevent its rotation during the operation of the apparatus.

In this embodiment, however, returning briefly to FIG. 9, there is a ratchet and pawl arrangement 68 intermediate the distal end of the screw threaded actuator arm 28 and a corkscrew auger 70 to allow the corkscrew auger 70 to rotate when the actuator arm 18 is rotated in one direction, clockwise, and to disengage those components so that the corkscrew auger 70 does not rotate with the actuator arm 28 when that actuator arm is rotated by the user in the opposite, or counterclockwise direction.

Figure 9C:
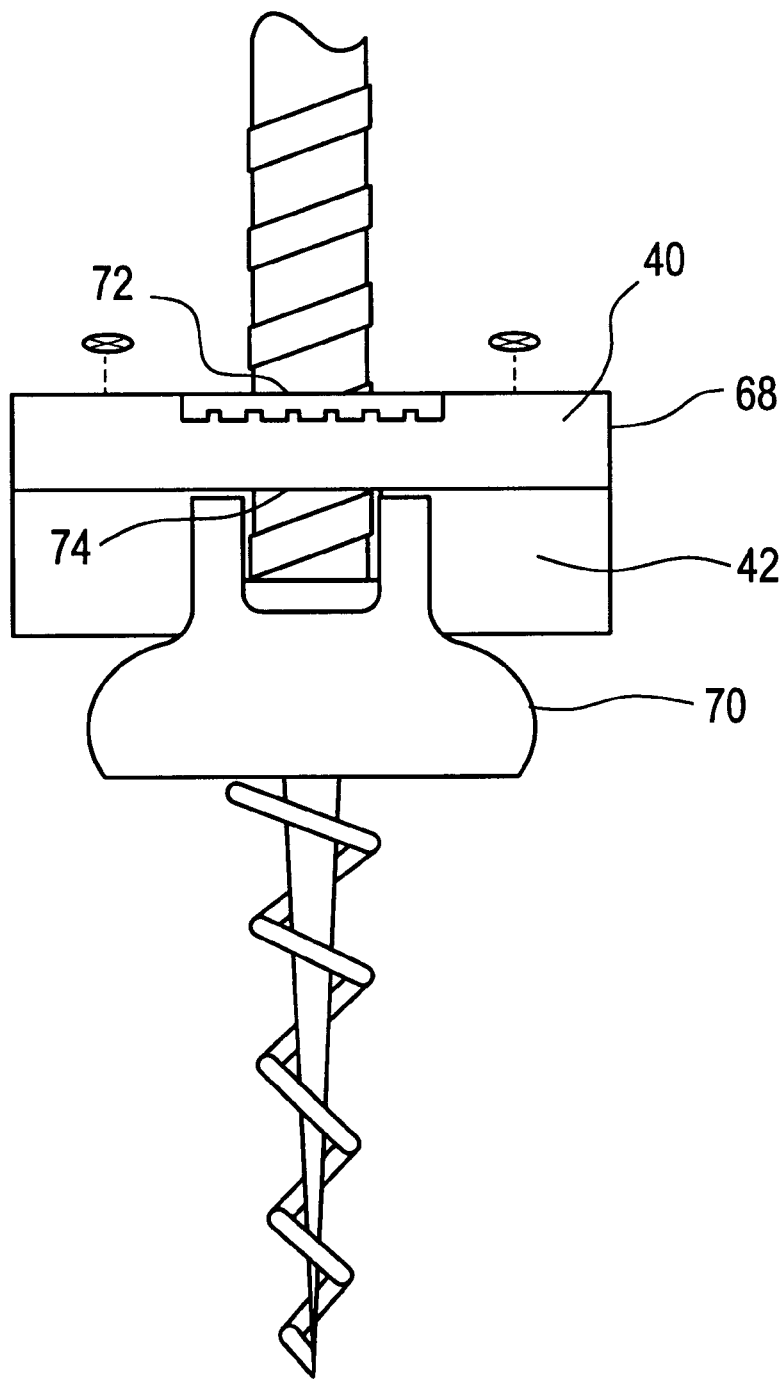
FIG. 9C is a schematic side sectional view showing the corkscrew apparatus of the embodiment of FIG. 9, and the specific construction of the piston component thereof.

Turning to FIG. 9C, there is shown a schematic view of the ratchet and pawl arrangement 68. The piston itself is, again, made up of upper and a lower portions 40 and 42. A fixed disc 72 is located in a depression in the upper portion of the piston 26 and serves to push the piston downwardly as the screw threaded actuator arm 28 is rotated in the clockwise direction. Similarly, a spring biased disc 74 acts as a ratchet to engage and disengage the corkscrew auger 70 during the operation of the apparatus. Accordingly, as the screw threaded actuator arm 28 is rotated in the clockwise direction, the ratchet and pawl arrangement 68 causes the actuator arm 28 to engage the corkscrew auger 70 causing it to rotate as the piston is moving in the downward direction into the cork of the wine bottle. After the corkscrew auger 70 has entered the cork to the desired firm position, the screw threaded actuator arm 28 is rotated in the counter-clockwise direction, thus disengaging the screw threaded actuator arm 28 from the corkscrew auger 70. The spring disc 72 acts to move the piston 26 in the upward direction and the cork is pulled out in a straight and non-rotating manner. Thus the corkscrew auger 70 pulls the cork directly out with little force required as the piston 26 moves along its guided track within juxtaposed surfaces 32.

Numerous further variations and combinations of the features discussed above can be utilized without departing from the spirit of the invention as defined by the claims below. Accordingly, the foregoing description of the preferred embodiment should be taken by way of illustration rather that by way of limitation of the invention as claimed.

What is claimed is:

1. An apparatus for the controlled fracture of the outer hull of nut-like fruit comprising:

A. a support housing comprising a base for the support of an anvil means for the reception of said nut-like fruit;

B. arcuate frame means communicating with said support housing, having an apical end and arms extending away therefrom, said arms adapted for connection to said base adjacent said anvil means, and a screw-threaded opening at said apical end;

C. reciprocable plunger means associated with said frame means, said plunger means comprising a reciprocable piston, said piston adapted for sliding contact with said arms throughout its extent of travel, and screw-threaded actuator arm means screw-threadedly reciprocable within said opening, said actuator arm having a proximal end freely rotatably journaled within said piston, and a distal end extending beyond said opening; and a key-like actuator mounted on said distal end for the rotation of said actuator arm in the operation of said plunger means;

D. wherein the operation of said apparatus permits the controlled fracture of the outer hull of the nut-like fruit without damaging the meat contained therein.

2. The apparatus of claim 1 wherein support housing includes a semi-cylindrical wall extending upward from said base, said wall adapted for communication with said arms to define a chamber for the retention of the nut-like fruit being fractured.

3. The apparatus of claim 1 including anvil means supported by said base and communicating with said arms, said anvil means having a concavity disposed therein for the cradling of said nut-like fruit.

4. The apparatus of claim 3 wherein said anvil means further defines a plurality of slots therein, for the passage there through of nut shell fragments.

5. The apparatus of claim 4 wherein said anvil means is essentially circular and disk-like, and said slots are disposed within an approximately semi-circular region of the broad surface thereof.

6. The apparatus of claim 1 wherein said arms define parallel tracks on their juxtaposed surfaces and said piston defines opposed slots in the marginal edge thereof for the reception of said tracks.

7. The apparatus of claim 6 wherein said piston defines a lower surface adapted for impact with said nut-like fruit, and said surface has a concavity disposed centrally therein.

8. An apparatus for the controlled pressing of a food product, comprising:

A. a support housing comprising a base for the support of an anvil means for the reception of said food product;

B. arcuate frame means communicating with said support housing, having an apical end and arms extending away therefrom, said arms adapted to be affixed to said base adjacent said anvil means, and a screw-threaded opening at said apical end;

C. reciprocable plunger means associated with said frame means, said plunger means comprising a reciprocable piston, said piston adapted for sliding contact with said arms throughout its extent of travel and screw-threaded actuator arm means screw-threadedly reciprocable within said opening, said actuator arm having a proximal end freely rotatably journaled within said piston, and a distal end extending beyond said opening; and a key-like actuator mounted on said distal end for the rotation of said actuator arm in the operation of said plunger means;

D. wherein the operation of said apparatus permits the pressing of a food product.

9. An apparatus for the controlled pressing of a food product as defined in claim 8 wherein said anvil means includes a plurality of apertures and said piston has a plurality of teeth adapted to interfit with and enter said apertures when said piston has pressed said food product.

10. An apparatus for the controlled pressing of a food product as defined in claim 9 wherein said teeth are frustro-conical in configuration.

\* \* \* \* \*